(12) United States Patent
Shimizu

(10) Patent No.: US 10,571,748 B2
(45) Date of Patent: *Feb. 25, 2020

(54) OPTICAL COMPONENT, TOUCHSCREEN PANEL, AND DISPLAY DEVICE

(71) Applicant: HOSIDEN CORPORATION, Yao-shi (JP)

(72) Inventor: Masato Shimizu, Yao (JP)

(73) Assignee: HOSIDEN CORPORATION, Yao-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,687

(22) Filed: Mar. 18, 2019

(65) Prior Publication Data

US 2019/0212598 A1 Jul. 11, 2019

Related U.S. Application Data

(62) Division of application No. 14/493,826, filed on Sep. 23, 2014, now Pat. No. 10,274,784.

(30) Foreign Application Priority Data

Sep. 27, 2013 (JP) .................................. 2013-202206

(51) Int. Cl.
*G02F 1/13363* (2006.01)
*G06F 3/041* (2006.01)
(Continued)

(52) U.S. Cl.
CPC .......... *G02F 1/13363* (2013.01); *G06F 3/041* (2013.01); *G06F 3/0421* (2013.01); *G02B 5/3083* (2013.01); *G02F 2202/28* (2013.01)

(58) Field of Classification Search
CPC .... G02B 5/3025; G02B 5/3041; G02B 5/305; G02B 5/3083; G02B 5/32; G02F 1/13363;
(Continued)

(56) References Cited

U.S. PATENT DOCUMENTS 6,020,945 A 2/2000 Sawai
10,274,784 B2 * 4/2019 Shimizu .............. G02F 1/13363
(Continued)

FOREIGN PATENT DOCUMENTS

EP 2426523 A2 3/2012
JP H06-258634 9/1994
(Continued)

OTHER PUBLICATIONS

English machine translation of WO-2014123209-A1 (Year: 2014).*
(Continued)

*Primary Examiner* — Nicholas R. Pasko
(74) *Attorney, Agent, or Firm* — Kratz, Quintos & Hanson, LLP

(57) ABSTRACT

The invention provides an optical component including a resin part having translucency and a phase plate. The phase plate is configured to be disposed on an emitting direction side of a display part capable of emitting linearly polarized light. The resin part is uncontrolled in terms of phase difference. The phase plate is configured to be disposed between the display part and the resin part. The phase plate has three to five times as large retardation as the resin part.

11 Claims, 3 Drawing Sheets

(51) Int. Cl.
*G06F 3/042* (2006.01)
*G02B 5/30* (2006.01)

(58) Field of Classification Search
CPC ........ G02F 2001/133531; G02F 2001/133562; G02F 2001/133638; G02F 2202/40; G02F 2413/02
USPC ............ 359/489.01, 489.02, 489.03, 489.07; 349/96, 117–121
See application file for complete search history.

(56) References Cited

U.S. PATENT DOCUMENTS

| | | |
|---|---|---|
| 2003/0210370 A1 | 11/2003 | Yang |
| 2008/0204610 A1* | 8/2008 | Matsumoto ......... G02F 1/13338 349/12 |
| 2010/0134448 A1 | 6/2010 | Park |
| 2012/0229732 A1 | 9/2012 | Koike |
| 2013/0100378 A1 | 4/2013 | Murata |
| 2014/0055373 A1 | 2/2014 | Powell |

FOREIGN PATENT DOCUMENTS

| | | | |
|---|---|---|---|
| JP | 2005-157082 A | 6/2005 | |
| JP | 2012-133313 A | 7/2012 | |
| JP | 2012-230390 A1 | 11/2012 | |
| WO | 2014/123209 A1 | 8/2014 | |
| WO | 2014/123210 A1 | 8/2014 | |
| WO | WO-2014123209 A1 * | 8/2014 | ......... G02F 1/13363 |

OTHER PUBLICATIONS

Partial human English translation of WO-2014123209-A1 (Year: 2014).*
Extended European Search Report for European Patent Application No. 14250104.8 dated Jan. 28, 2015 (7 pages).
Office Action Pursuant to Article 94(3) EPC of European Patent Application No. 16020474.9 dated Dec. 17, 2018 (6 sheets).
Japanese Office Action of counterpart Japanese Application No. 2013-202206; Notification of Reasons for Refusal dated Dec. 6, 2016 (2 pages, 3 pages translation, 5 pages total).

* cited by examiner

OPTICAL COMPONENT, TOUCHSCREEN PANEL, AND DISPLAY DEVICE

CROSS-REFERENCE TO RELATED APPLICATIONS

The present application is a Divisional Application of U.S. patent application Ser. No. 14/493,826 filed on Sep. 23, 2014, which claims priority under 35 U.S.C. § 119 of Japanese Patent Application No. 2013-202206 filed on Sep. 27, 2013, the contents of each of which are expressly incorporated herein by reference in their entirety.

BACKGROUND OF THE INVENTION

Technical Field

The invention relates to optical components, touchscreen panels, and display devices.

Background Art

Japanese Patent Application Laid-Open Nos. 06-258634 (Patent Literature 1) and 2012-230390 (Patent Literature 2) disclose display devices that are viewable through polarized sunglasses or the like. The display device of Patent Literature 1 includes a liquid crystal display (LCD) panel, a front-side polarizing plate on the front of the LCD panel, and a phase plate on the front of the polarizing plate. The phase plate is oriented such that its optic axis forms an angle of approximately 35° to 55° with the absorption axis of the front-side polarizing plate. The phase plate is configured to have a retardation in a range of approximately 4,000 nm or larger. Linearly polarized light emitted from the front-side polarizing plate travels through the phase plate to be converted into elliptically polarized light. Hence, the display device is viewable from any direction through polarized sunglasses or the like, without suffering from uneven coloring in the display face.

The display device of Patent Literature 2 includes an LCD panel, a polymer film, and a polarizing plate disposed therebetween. The LCD panel has white light emitting diodes serving as a backlight source. The polymer film has retardation in the range of 3,000 nm to 30,000 nm. The polymer film is oriented such that its slow axis forms an angle of approximately 45° with the absorption axis of the polarizing plate. The white light emitting diodes exhibit an emission spectrum of a similar shape to the envelope curve of the spectrum of transmitted light traveling through the polymer film. This configuration aims to improve visibility of the display device when viewed through polarized sunglasses or the like.

SUMMARY OF INVENTION

Some display devices include resin panels serving as cover panels or other components. The inventor conceived of using resin panels that are molded without controlling their birefringent properties. Such resin panels may be fabricated by molding resin without controlling birefringent properties. In this case, partial birefringence may occur due to the molecular orientations and/or photoelasticity, resulting from material characteristics during the molding process, resin flows during the molding process, and residual stress generated during the molding process, and/or other factors. Resin panels may also be fabricated by an extruding process or a stretching process, which may also cause birefringence. It should be noted that the conventional display devices described above include no resin panels fabricated without controlling phase differences. Accordingly, no considerations are given to how to improve display visibility of display devices equipped with such an uncontrolled resin panel when viewed through polarized sunglasses or the like.

The invention has been conceived in view of the above circumstances to provide an optical component capable of improving display visibility of a display part allowing that the optical component includes a resin part that is uncontrolled with respect to phase difference. The invention also provides a touchscreen panel and a display device including the optical component.

An optical component of an aspect of the invention includes a resin part having translucency and a phase plate. The phase plate is configured to be disposed on an emitting direction side of a display part capable of emitting linearly polarized light. The resin part is uncontrolled in terms of phase difference. The phase plate is configured to be disposed between the display part and the resin part. The phase plate has three to five times as large retardation as the resin part.

The optical component of this aspect is disposed on the emitting direction side of the display part. As the phase plate has three to five times as large retardation as the resin part, the optical component can suppress the possibility of occurrence of iridescent unevenness and blackout in displayed images of the display part when viewed through a polarizing plate (such as polarized sunglasses or a panel of electronic equipment) and the optical component. Therefore, the invention can improve visibility of displayed images of the display part.

The retardation of the phase plate may be at least 3,000 nm. The retardation of the phase plate may be at least 5,000 nm. The retardation of the phase plate may be at least 10,000 nm. The phase plate may be oriented such that an optic axis of the phase plate forms an angle of approximately 45 degrees with a polarization axis of the linearly polarized light emitted from the display part.

A touchscreen panel of the invention includes the optical component of any of the above aspects and a sensor capable of detecting an approach of a detection target. The sensor may be disposed between the phase plate of the optical component and the display part or between the resin part of the optical component and the phase plate of the optical component.

A display device of the invention includes a display part capable of emitting linearly polarized light and the optical component of any of the above aspects. The optical component may be disposed on the emitting direction side of the display part.

DESCRIPTION OF EMBODIMENTS

A display device L according to the first embodiment of the invention will be described referring to FIG. 1. The display device L illustrated in FIG. 1 includes a display part 100 and a touchscreen panel T. These constituents of the display device L will be described below in detail.

Figure 1:
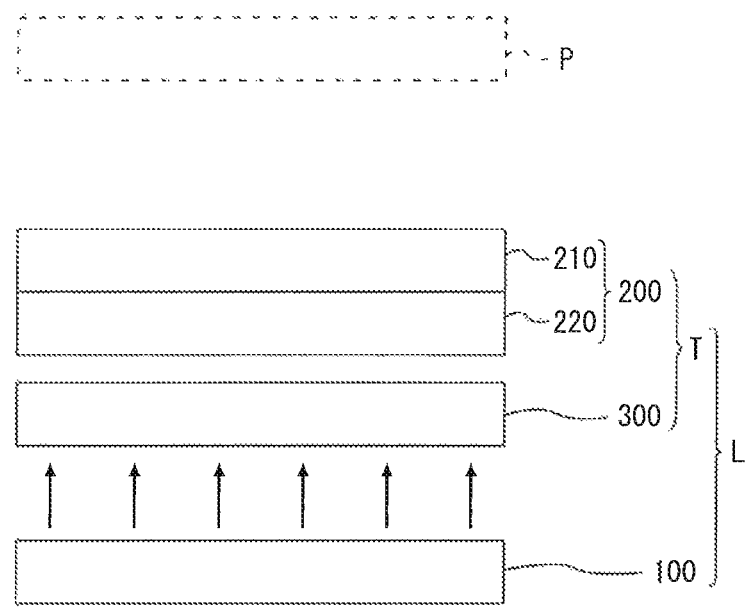
FIG. 1 is an explanatory diagram illustrating a relative positioning of constituents of a display device according to the first embodiment of the invention with respect to a polarizing plate.

As illustrated in FIG. 1, the display part 100 can emit linearly polarized light. For example, the display part 100 may be an LCD panel, an organic light-emitting diode (OLED) device, or the like. The LCD panel may be of a simple matrix driving type or of an active matrix driving type such as a thin-film transistor (TFT) type.

The touchscreen panel T includes an optical component 200 and a sensor 300. The optical component 200 is disposed with spacing from the display part 100, on the side of the emitting direction (direction of arrows illustrated) of linearly polarized light emitted from the display part 100. The optical component 200 includes a resin part 210 and a phase plate 220. The resin part 210 is of a resin material that is uncontrolled in terms of phase difference. For example, it may be a molded resin article that is uncontrolled in terms of phase difference, an extruded plate of resin material (e.g. polycarbonate (PC) resin, PMMA resin, and the like), or a stretched film of resin material (e.g., polyethylene terephthalate, PC, and the like). Generally speaking, resin molded articles, if molded without controlling birefringence, may partially have birefringence due to the molecular orientation and/or photoelasticity, resulting from material characteristics during the molding process, resin flows during the molding process, residual stress generated during the molding process, and/or other factors. Also, extruded plates may have birefringence due to the extruding process of resin material. Stretched films may have birefringence due to the stretching process of resin material. For any of the above reasons, the resin part 210 may become unintentionally birefringent and uncontrolled in terms of phase difference.

The phase plate 220 is fixed to the rear face of the resin part 210 in the emitting direction so as to be positioned between the resin part 210 and the display part 100. The phase plate 220 has three to five times as large retardation as the resin part 210. The retardation of the phase plate 220 is set at 3,000 nm or larger. More preferably, the retardation of the phase plate 220 is 5,000 nm or larger, and still more preferably 10,000 nm or larger. This is because, with increasing retardation of the phase plate 220, the light that has traveled through the phase plate 220 contains more wavelengths in which circularly polarized light, elliptically polarized light, and linearly polarized light exist throughout the visible spectrum. If this traveled light changes in polarization state when travelling through the resin part 210, the outgoing light has a wide variety of polarization states throughout the visible spectrum. The phase plate 220 is oriented such that the optic axis (slow axis) of the phase plate 220 forms an angle of approximately 45° with the polarization axis of linearly polarized light emitted from the display part 100.

The sensor 300 is a sensor of the touchscreen panel T and can detect a detection target (a finger or a stylus pen) approaching the display device L. The sensor 300 is optically isotropic. The sensor 300 is disposed between the display part 100 and the phase plate 220.

The inventor performed the following experiments in the process of inventing the above display device L. In these experiments, the inventor viewed the respective display devices for the first to fourth experimental examples through a polarizing plate P to check if iridescent unevenness and/or blackout occur to displayed images of the display devices. It should be appreciated that the polarizing plate P may be polarized sunglasses, a panel of electronic equipment (a touchscreen panel, a car navigation device, a display device (e.g. an indicator of an automobile), or the like.

Figure 2A:
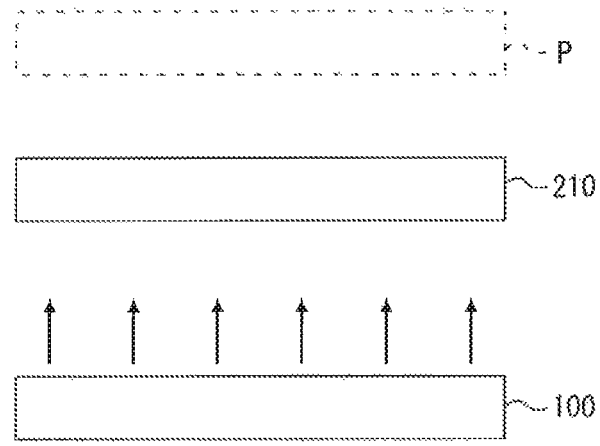
FIG. 2A is an explanatory diagram illustrating a relative positioning of constituents of a display device in the first experimental example with respect to a polarizing plate.
Figure 2B:
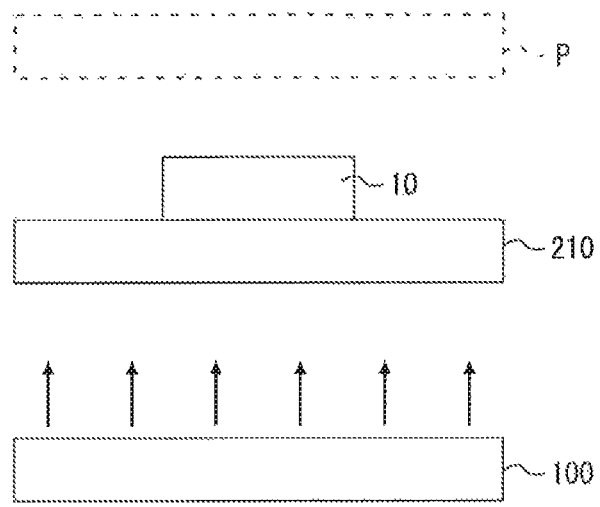
FIG. 2B is an explanatory diagram illustrating a relative positioning of constituents of a display device in the second experimental example with respect to a polarizing plate.
Figure 2C:
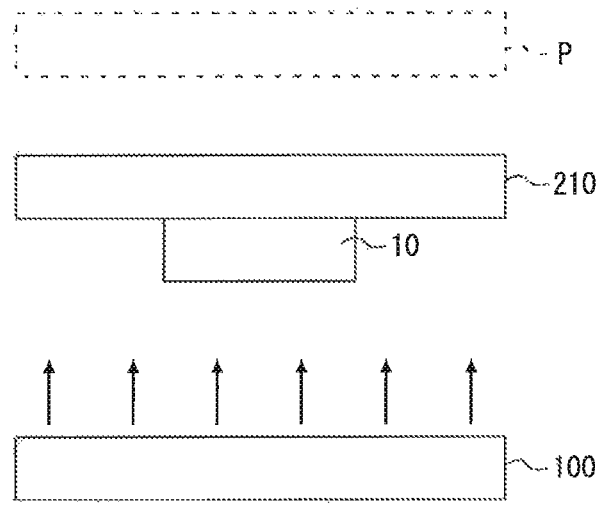
FIG. 2C is an explanatory diagram illustrating a relative positioning of constituents of a display device in the third experimental example with respect to a polarizing plate.
Figure 2D:
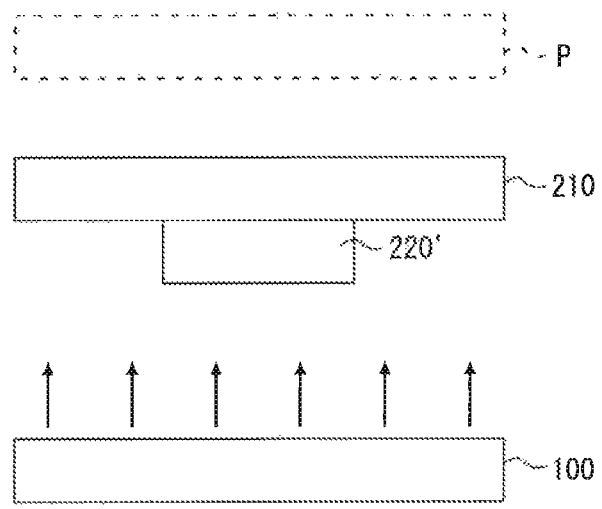
FIG. 2D is an explanatory diagram illustrating a relative positioning of constituents of a display device in the fourth experimental example with respect to a polarizing plate.

The display device of the first experimental example as illustrated in FIG. 2A includes a display part 100, and a resin part 210 disposed so as to face the emitting direction side of the display part 100. The display device of the second experimental example as illustrated in FIG. 2B includes a display part 100, a resin part 210 on the emitting direction side of the display part 100 with a space therebetween, and a quarter-wave plate 10 on the front of the resin part 210 in the emitting direction. The display device of the third experimental example as illustrated in FIG. 2C includes a display part 100, a resin part 210 on the emitting direction side of the display part 100 with a space therebetween, and a quarter-wave plate 10 on the rear of the resin part 210 in the emitting direction. Each quarter-wave plate 10 in the second and third experimental examples has a smaller outer face than that of the display part 100. The quarter-wave plate 10 has a retardation of 140 nm. The display device of the fourth experimental example as illustrated in FIG. 2D includes a display part 100, a resin part 210 disposed on an emitting direction side of the display part 100 with a space therebetween, and a phase plate 220' on the rear face of the resin part 210 in the emitting direction. The phase plate 220' has the same configuration as the phase plate 220, only different in that the phase plate 220' has a smaller outer face than that of the display part 100.

In the display device of the first experimental example, linearly polarized light emitted from the display part 100 directly enters the resin part 210 that is not controlled in terms of phase difference. The light changes in polarization state when travelling through the resin part 210. As a result, iridescent unevenness and/or partial blackout occurred to displayed images of the display device, in any of the cases where the polarization direction of the linearly polarized light of the display part 100 and the polarization direction of the polarizing plate P are (1) substantially parallel to each other, (2) substantially perpendicular to each other, and (3) at an angle to each other that is not parallel or perpendicular.

In the display device of the second experimental example, linearly polarized light emitted from the display part 100 directly enters the resin part 210 that is not controlled in terms of phase difference. The light changes in polarization state when travelling through the resin part 210. The changed light then travels through the quarter-wave plate 10 in the superimposed area of the resin part 210 and the quarter-wave plate 10. However, iridescent unevenness and/or partial blackout occurred to displayed images in the superimposed area of the display device, in any of the cases where the polarization direction of the linearly polarized light of the display part 100 and the polarization direction of the polarizing plate P are (1) substantially parallel to each other, (2) substantially perpendicular to each other, and (3) at an angle to each other that is not parallel or perpendicular.

In the display device of the third experimental example, linearly polarized light emitted from the display part 100 travels through the quarter-wave plate 10 in the superimposed area of the resin part 210 and the quarter-wave plate 10 and then travels through the resin part 210 that is not controlled in terms of phase difference. The linearly polarized light traveling through the quarter-wave plate 10 is converted into elliptically polarized light and then changes in polarization state when travelling through the resin part 210. As a result, iridescent unevenness and/or partial blackout occurred to displayed images in the superimposed area of the display device, in any of the cases where the polarization direction of the linearly polarized light of the display part 100 and the polarization direction of the polarizing plate P are (1) substantially parallel to each other, (2) substantially perpendicular to each other, and (3) at an angle to each other that is not parallel or perpendicular.

In the display device of the fourth experimental example, linearly polarized light emitted from the display part 100 travels through the phase plate 220' in the superimposed area of the resin part 210 and the phase plate 220' and then travels through the resin part 210 that is not controlled in terms of phase difference. The linearly polarized light traveling through the phase plate 220' is converted into light that contains more wavelengths in which circularly polarized light, elliptically polarized light, and linearly polarized light exist throughout the visible spectrum. The light then travels through the resin part 210 and may change in polarization state, but the outgoing light has a wide variety of polarization states throughout the visible spectrum. As a result, iridescent unevenness and/or blackout did NOT occur to displayed images in the superimposed area of the display device, in any of the cases where the polarization direction of the linearly polarized light of the display part 100 and the polarization direction of the polarizing plate P are (1) substantially parallel to each other, (2) substantially perpendicular to each other, and (3) at an angle to each other that is not parallel or perpendicular.

As apparent from the above experiments, the display device L, although including the resin part 210 that is not controlled in terms of phase difference, is able to suppress occurrence of iridescent unevenness and blackout in displayed images of the display part 100 when viewed through the polarizing plate P. The display device L can thus improve visibility of displayed images of the display device L. The linearly polarized light emitted from the display part 100 travels through the phase plate 220 to be converted into light that contains many wavelengths in which circularly polarized light, elliptically polarized light, and linearly polarized light exist throughout the visible spectrum. The light then travels through the resin part 210 and may change in polarization state, but the outgoing light has a wide variety of polarization states (i.e. circularly polarized light, elliptically polarized light, and linearly polarized light) throughout the visible spectrum. Hence, when the display device L is viewed through the polarizing plate P, the displayed images are viewed with color tones close to the colors as going out from the display part 100 because of the suppressed occurrences of iridescent unevenness and/or blackout in the displayed images of the display part 100. Larger retardation of the phase plate 220 is preferable because light of a larger variation of wavelengths travels through the polarizing plate P and can be viewed in color tones closer to the light source color of the display part 100. More particularly, it is made apparent the display device L can suppress occurrences of iridescent unevenness and blackout in displayed images of the display device, in any of the cases where the polarization direction of the linearly polarized light of the display part 100 and the polarization direction of the polarizing plate P are (1) substantially parallel to each other, (2) substantially perpendicular to each other, and (3) at an angle to each other that is not parallel or perpendicular. As the phase plate 220 has retardation of 3,000 nm or larger, certain variation in phase difference within the phase plate 220 would not cause coloring that would be recognizable by human eyes. The light traveling through the phase plate 220 is seen in colors similar to the linearly polarized light emitted from the display part 100.

It should be noted that the display device L, the touchscreen panel T, and the optical component 200 described above are not limited to the above embodiment but may be modified in any manner within the scope of the claims. Specific modifications will be described below in detail.

The optical component of the invention may be any optical component being adapted to be disposed on an emitting direction side of a display part capable of emitting linearly polarized light, and including a resin part having translucency and being uncontrolled with respect to phase difference; and a phase plate being configured to be disposed between the display part and the resin part and having three to five times as large retardation as the resin part. The resin part and the phase plate described above may be paced apart from each other. Further, the above phase plate may be fixed to a sensor or a display part so as to be positioned on the emitting direction side of the display part.

The sensor of the invention can be omitted. In other words, the display device of the invention may be any display device including a display part, capable of emitting linearly polarized light, and an optical component of the above embodiment or the above modifications which can be disposed on the emitting direction side of the display part. Between the above display part and the above optical component there may be disposed any optically isotropic member (e.g., a sensor of a touchscreen panel, optically clear adhesive (OCA), a triacetyl cellulose (TAC) film, or a cycloolefin polymer (COP) film, and the like). Such an optically isotropic member can be disposed between the resin part and the phase plate of the optical component or between the phase plate and the display part. It should be appreciated that the display part of the invention includes a display part main body and a polarizing plate, and the polarizing plate may be disposed on the light emitting direction side of the display part main body and convert the light into linearly polarized light. In other words, the display part of the invention is not limited to one including a display part main body adapted to emit linearly polarized light.

The invention allows for the touchscreen panel and the display part as separate components.

It should be appreciated that the display device L, the touchscreen panel T, and the optical component 200 of the above embodiment are described above by way of examples only and may comprise any materials, shapes, dimensions, numbers, arrangements, and other configurations if they can perform similar functions. The configurations of the embodiment and the modifications described above may be combined in any possible manner.

REFERENCE SIGNS LIST

L: Display device
100: Display part
T: Touchscreen panel
200: Optical component
210: Resin part
220: Phase plate
300: Sensor

The invention claimed is:
1. A touchscreen panel comprising:
an optical component including:

a resin part having translucency, the resin part being configured to be disposed on an emitting direction side of a display part capable of emitting linearly polarized light, the resin part being a molded article of resin material partially having birefringence due to molecular orientation and/or photoelasticity of the resin material, or alternatively the resin part being an extruded plate of resin material having birefringence due to an extruding process of the resin material, and a phase plate configured to be disposed between the display part and the resin part, the phase plate having a retardation that is three to five times larger than a retardation of the resin part or alternatively having a retardation of at least 3,000 nm; and a plurality of optically isotropic members, the optically isotropic members including:
  at least one first optically isotropic member including a sensor capable of detecting an approach of a detection target, and
  at least one second optically isotropic member,
wherein the touchscreen panel is configured such that only the at least one first optically isotropic member is disposed between the resin part and the phase plate of the optical component, and that only the at least one second optically isotropic member is disposed between the phase plate of the optical component and the display part.

2. The touchscreen panel according to claim 1, wherein the phase plate is oriented such that an optic axis of the phase plate forms an angle of approximately 45 degrees with a polarization axis of the linearly polarized light emitted from the display part.

3. A display device comprising:
a display part capable of emitting linearly polarized light; and
the touchscreen panel according to claim 1.

4. The touchscreen panel according to claim 1, wherein the retardation of the phase plate is at least 5,000 nm.

5. The touchscreen panel according to claim 4, wherein the retardation of the phase plate is at least 10,000 nm.

6. A touchscreen panel comprising:
an optical component including:
a resin part having translucency, the resin part being configured to be disposed on an emitting direction side of a display part capable of emitting linearly polarized light, the resin part being a molded article of resin material partially having birefringence due to molecular orientation and/or photoelasticity of the resin material, or alternatively the resin part being an extruded plate of resin material having birefringence due to an extruding process of the resin material, and a phase plate configured to be disposed between the display part and the resin part, the phase plate having a retardation that is three to five times larger than a retardation of the resin part or alternatively having a retardation of at least 3,000 nm; and at least one optically isotropic member including a sensor capable of detecting an approach of a detection target,
wherein the touchscreen panel is configured such that only the at least one optically isotropic member is disposed between the phase plate of the optical component and the display part.

7. The touchscreen panel according to claim 6, wherein the phase plate is oriented such that an optic axis of the phase plate forms an angle of approximately 45 degrees with a polarization axis of the linearly polarized light emitted from the display part.

8. A display device comprising:
a display part capable of emitting linearly polarized light; and
the touchscreen panel according to claim 6.

9. The touchscreen panel according to claim 6, wherein the retardation of the phase plate is at least 5,000 nm.

10. The touchscreen panel according to claim 9, wherein the retardation of the phase plate is at least 10,000 nm.

11. A touchscreen panel comprising:
an optical component including:
a resin part having translucency, the resin part being configured to be disposed on an emitting direction side of a display part capable of emitting linearly polarized light, the resin part being a molded article of resin material partially having birefringence due to molecular orientation and/or photoelasticity of the resin material, or alternatively the resin part being an extruded plate of resin material having birefringence due to an extruding process of the resin material, and a phase plate configured to be disposed between the display part and the resin part, the phase plate having a retardation that is three to five times larger than a retardation of the resin part or alternatively having a retardation of at least 3,000 nm; and at least one optically isotropic member including a sensor capable of detecting an approach of a detection target,
wherein the touchscreen panel is configured such that only the at least one optically isotropic member is disposed between the resin part and the phase plate of the optical component.

* * * * *